(12) United States Patent
Zhang et al.

(10) Patent No.: US 10,043,383 B2
(45) Date of Patent: Aug. 7, 2018

(54) INFRARED EMISSION AND RECEPTION CIRCUIT AND METHOD OF IMPLEMENTING THE SAME

(71) Applicant: Tianjia (Shanghai) Info Tech Co., Ltd., Shanghai (CN)

(72) Inventors: Yuke Zhang, Shanghai (CN); Jianfeng Wang, Shanghai (CN); Shubin Wu, Shanghai (CN)

(73) Assignee: Tianjia (Shanghai) Info Tech Co., Ltd., Shanghai (CN)

( * ) Notice: Subject to any disclaimer, the term of this patent is extended or adjusted under 35 U.S.C. 154(b) by 174 days.

(21) Appl. No.: 14/902,440

(22) PCT Filed: Jun. 30, 2014

(86) PCT No.: PCT/CN2014/081143
§ 371 (c)(1),
(2) Date: Dec. 31, 2015

(87) PCT Pub. No.: WO2015/000391
PCT Pub. Date: Jan. 8, 2015

(65) Prior Publication Data
US 2017/0004704 A1    Jan. 5, 2017

(30) Foreign Application Priority Data

Jul. 2, 2013 (CN) .................... 2013 2 0389091 U
Jul. 23, 2013 (CN) .................... 2013 1 0312245
Jul. 23, 2013 (CN) .................... 2013 2 0441531 U (51) Int. Cl.
*G08C 23/04* (2006.01)
*H04B 1/3827* (2015.01)
*H04B 10/69* (2013.01)

(52) U.S. Cl.
CPC ........... *G08C 23/04* (2013.01); *H04B 1/3833* (2013.01); *H04B 10/69* (2013.01)

(58) Field of Classification Search
None
See application file for complete search history.

(56) References Cited

U.S. PATENT DOCUMENTS

2004/0208182 A1* 10/2004 Boles .................. G06F 8/65
370/395.5
2008/0069567 A1* 3/2008 Smith .................. G08C 19/28
398/106

(Continued)

FOREIGN PATENT DOCUMENTS

CN    101609604 A    12/2009

*Primary Examiner* — Laura Nguyen
(74) *Attorney, Agent, or Firm* — MKG, LLC (57) ABSTRACT

An infrared (IR) emission and reception circuit, which is composed of three parts, an IR transceiver circuit, a carrier-smoothed circuit, and a signal recognition circuit. The IR transceiver circuit receives an outside IR signal, converts it to an electrical signal, and then amplifies and shapes the electrical signal to form a carrier frequency read signal; the IR transceiver circuit also emits an IR signal outward. The carrier-smoothed circuit receives the carrier frequency read signal, filters out the carrier to form a carrier-smoothed signal, and outputs it to the signal recognition circuit. The signal recognition circuit receives the carrier-smoothed signal, and converts it to an IR recognition signal to output to the electronic-device processor. The electronic-device processor receives the carrier frequency read signal to recognize the carrier frequency of the outside IR signal, and also receives the IR recognition signal to learn IR control codes of the outside IR signal.

6 Claims, 5 Drawing Sheets

(56) References Cited

U.S. PATENT DOCUMENTS

2010/0141473 A1  6/2010  Tzeng
2010/0189198 A1* 7/2010  Eskin ................. H04L 27/0014
                                              375/340

* cited by examiner

INFRARED EMISSION AND RECEPTION CIRCUIT AND METHOD OF IMPLEMENTING THE SAME

FIELD OF THE INVENTION

The invention relates to an infrared (IR) emission and reception circuit, especially to an IR emission and reception circuit integrated in such an electronic device as a cell phone and a tablet computer.

BACKGROUND OF THE INVENTION

An IR remote control, as a remote control device transmitting control signals by IR signals with a wavelength from 0.76 μm to 1.5 μm, is widely used in the field of industrial control and household electrical appliances. The IR signal is converted from an electrical signal, e.g., the high/low level of the electrical signal is indicated by presence/absence of the IR light, respectively. And the electrical signal (i.e., the control signal) is a modulated signal formed by modulation of an IR control code onto a carrier.

Figure 1:
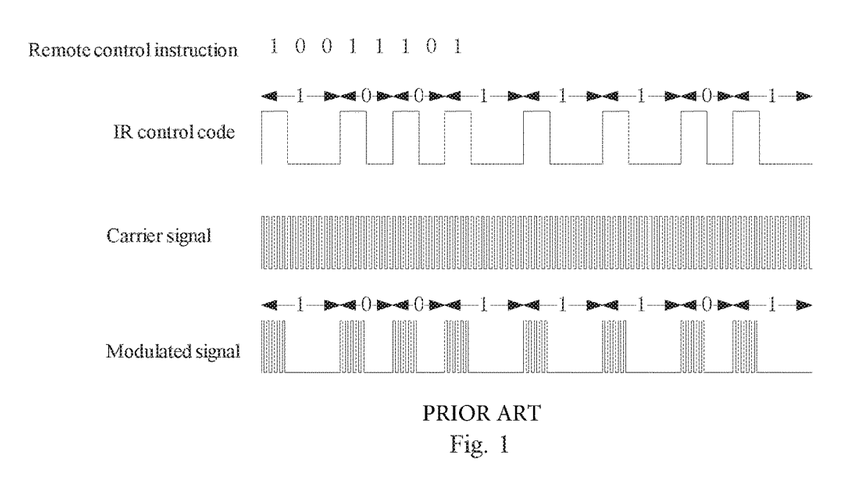
FIG. 1 is a schematic diagram of conversion of the remote control instruction and the IR control code, and modulation of the IR control code onto the carrier signal.

The IR control code is used for representing a remote control instruction. As shown in FIG. 1, with the remote control instruction as a string of binary digits, the IR control code represents the remote control instruction by the combination of high and low levels. Taking the NEC protocol format definition for an example: In the IR control code, a binary digit 0 is represented by the combination of a high level for a duration of 0.5625 ms and a low level for a duration of 0.5625 ms, and a binary digit 1 is represented by the combination of a high level for a duration of 0.5625 ms and a low level for a duration of 1.6875 ms. The carrier signal is a square wave signal. The control signal is a modulated signal formed by modulation of the IR control code onto a carrier through pulse amplitude modulation (PAM). The pulse amplitude modulation means that the high and low levels of the IR control code are indicated by the carrier square wave signal and the low level in the modulated signal, respectively.

A self-learning remote control is a universal IR remote control that, after learning the original remote control, has the IR remote control function of the original remote control. Colloquially, the self-learning remote control is equivalent to a key blank that can copy any shape of keys.

The self-learning remote control is divided into two categories, a fixed code format self-learning remote control and a waveform copy self-learning remote control.

The fixed code format self-learning IR remote control is achieved by first collecting, summarizing and classifying the IR remote control signals used on the market, and then preparing a decoding program and an emitting program for each category. Its learning process is as follows: Determining the category of the existing IR remote control signal, selecting the decoding program and emitting program of the IR remote control signal of this category, and storing the programs in a memory such as EEPROM. The fixed code format self-learning IR remote control is advantageous in having low requirements for operating frequency of the master chip and capacity of the memory, but disadvantageous in only learning the IR remote control signals that have been collected. A typical representative of this self-learning remote control is the New HTC One cell phone of the HTC company.

The waveform copy self-learning IR remote control is achieved by copying completely an IR remote control signal emitted by the original remote control regardless of the format, and compressing the IR remote control signal before storing it in the memory. In need of emission, the compressed IR remote control signal is read by the memory, and extracted to the original IR remote control signal before being emitted. The waveform copy self-learning IR remote control is advantageous in the ability of learning any type of IR remote control signals, but disadvantageous in having high requirements for operating frequency of the master chip and capacity of the memory. A typical representative of this self-learning remote control is a cell phone OTG self-learning remote control accessory of Tianjia (Shanghai) Information Technology Co., Ltd.

The existing waveform copy self-learning IR remote control usually uses an integrated IR receiver, and has two drawbacks:

1) The integrated IR receiver can only receive an IR signal, but cannot emit an IR signal.
2) With the IR signal modulated by a carrier, the integrated IR receiver directly filters out the carrier. This makes the waveform copy self-learning IR remote control using the integrated IR receiver has to supplementarily record the carrier information by an auxiliary means after learning.

SUMMARY

A technical problem to be solved by the invention is to provide a compact IR emission and reception circuit able to recognize carriers, which can thus be integrated in cell phones and other intelligent electronic devices, and can simplify operation of the waveform copy self-learning IR remote control.

In order to solve at least the above technical problem, the IR emission and reception circuit disclosed herein is composed of three parts, an IR transceiver circuit, a carrier-smoothed circuit, and a signal recognition circuit, and is connected to an electronic-device processor.

The IR transceiver circuit receives an outside IR signal, converts it to an electrical signal, then amplifies and shapes the electrical signal to form a carrier frequency read signal (IR Signal with carrier PAM information), and then outputs the carrier frequency read signal to the carrier-smoothed circuit and the electronic-device processor; the IR transceiver circuit also emits outward the IR signal converted from the carrier signal outputted by the electronic-device processor.

The carrier-smoothed circuit receives the carrier frequency read signal, filters out the carrier to form a carrier-smoothed signal, and outputs it to the signal recognition circuit.

The signal recognition circuit receives the carrier-smoothed signal (IR Signal without carrier PAM information), and converts it to an IR recognition signal to output to the electronic-device processor.

The electronic-device processor receives the carrier frequency read signal, and analyzes it to recognize the carrier frequency of the outside IR signal; the electronic-device processor also receives the IR recognition signal, and analyzes it to learn the IR control code of the outside IR signal; the electronic-device processor also outputs a control signal to the IR transceiver circuit, so as to let the IR transceiver circuit stay in the standby or working state; the electronic-device processor also outputs a carrier signal to the IR transceiver circuit.

The method of implementing the IR emission and reception circuit of this application includes two parts, receiving an IR signal and emitting an IR signal.

Receiving the IR signal comprises the following steps:

Step 1: The electronic-device processor outputs a control signal to the IR transceiver circuit, so that the IR transceiver circuit is in the working state.

Step 2: The IR transceiver circuit receives an outside IR signal, converts it to an electrical signal, then amplifies and shapes the electrical signal to form a carrier frequency read signal, and then outputs the carrier frequency read signal to the carrier-smoothed circuit and the electronic-device processor.

Step 3: The carrier-smoothed circuit receives this carrier frequency read signal, filters out the carrier to form a carrier-smoothed signal, and outputs it to the signal recognition circuit.

The electronic-device processor receives this carrier frequency read signal, and analyzes it to recognize the carrier frequency of the outside IR signal.

Step 4: The signal recognition circuit receives this carrier-smoothed signal, and converts it to an IR recognition signal to output to the electronic-device processor.

Step 5: The electronic-device processor also receives this IR recognition signal, and analyzes it to learn the IR control code of the outside IR signal.

Emitting the IR signal comprises the following steps:

Step 1: The electronic-device processor outputs a control signal to the IR transceiver circuit, so that the IR transceiver circuit is in the working state.

Step 2: The electronic-device processor outputs a carrier signal to the IR transceiver circuit.

Step 3: The IR transceiver circuit converts this carrier signal from an electrical signal to an IR signal and emits it out.

The IR emission and reception circuit disclosed herein, filtering out the carrier by a hardware circuit, can reduce the processing cost of the intelligent-electronic-device processor, and can learn the IR remote control signal more efficiently.

DETAILED DESCRIPTION

Figure 2:
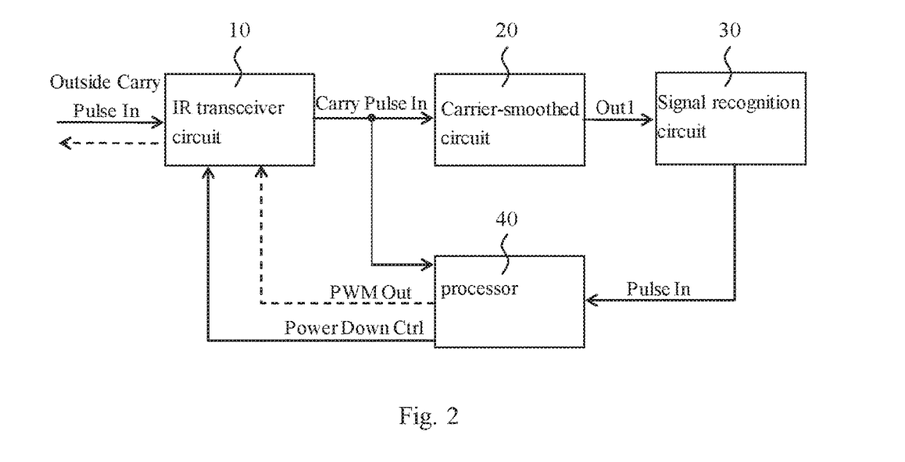
FIG. 2 is a schematic diagram of the overall structure of the IR emission and reception circuit of this application.

As shown in FIG. 2, the IR emission and reception circuit of this application, integrated in such an electronic device as a cell phone and a tablet computer, is composed of three parts, an IR transceiver circuit 10, a carrier-smoothed circuit 20, and a signal recognition circuit 30.

On the one hand, the IR transceiver circuit 10 receives an outside IR signal Outside Carry Pulse In, converts it to an electrical signal, then amplifies and shapes the electrical signal to form a carrier frequency read signal Carry Pulse In, and outputs the carrier frequency read signal to the carrier-smoothed circuit 20 and the electronic-device processor 40. This carrier frequency read signal Carry Pulse In is a digital signal, and is a modulated signal formed by modulation of the IR control code onto a carrier.

On the other hand, the IR transceiver circuit 10 emits outward an IR signal, which is the IR signal converted from a carrier signal Pulse-Width Modulation (PWM) Out (an electrical signal) outputted by the electronic-device processor 40.

The carrier-smoothed circuit 20 receives this carrier frequency read signal Carry Pulse In, filters out the carrier therein to form a carrier-smoothed signal Out1, and outputs the carrier-smoothed signal to a signal recognition circuit 30. This carrier-smoothed signal Out1 is an analog voltage signal that only keeps the IR control code of the outside IR signal Outside Carry Pulse In.

The signal recognition circuit 30 receives this carrier-smoothed signal Out1, converts it from an analog voltage signal to a square wave signal, i.e. the IR recognition signal Pulse In, and outputs the IR recognition signal to the electronic-device processor 40. This IR recognition signal Pulse In is a digital signal, i.e. the IR control code of the outside IR signal Outside Carry Pulse In.

The electronic-device processor 40 receives this carrier frequency read signal Carry Pulse In, and analyzes it to recognize the carrier frequency of the outside IR signal Outside Carry Pulse In. The electronic-device processor 40 also receives this IR recognition signal Pulse In, and analyzes it to learn the IR control code of the outside IR signal Outside Carry Pulse In. The electronic-device processor 40 stores the carrier frequency and IR control code of the outside IR signal Outside Carry Pulse In. When needed, the electronic-device processor 40 may modulate the IR control code stored previously or obtained by learning onto a carrier having the corresponding frequency, thus forming a carrier signal PWM Out (which is a modulated signal) to output to the IR transceiver circuit 10.

The electronic-device processor 40 outputs a control signal Power Down Ctrl to the IR transceiver circuit 10. This control signal Power Down Ctrl is used for letting the IR transceiver circuit 10 stay in the standby state or in the working state. The electronic-device processor 40 also outputs a carrier signal PWM Out to the IR transceiver circuit 10.

Figure 3:
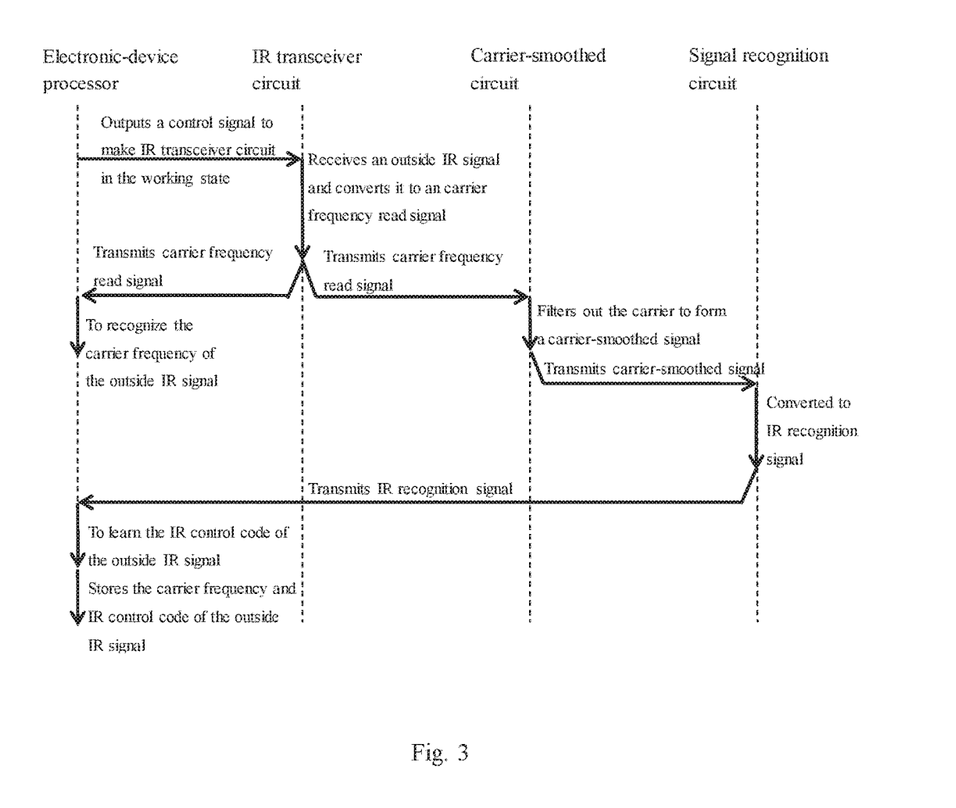
FIG. 3 is a flow diagram of the working method of the IR emission and reception circuit of this application for receiving the IR signal.

As shown in FIG. 3, the working method of the IR emission and reception circuit of this application for receiving an IR signal (typically used for learning other IR remote control) is as follows:

Step 1: The electronic-device processor 40 outputs a control signal Power Down Ctrl to the IR transceiver circuit 10, so that the IR transceiver circuit 10 is in the working state.

Step 2: The IR transceiver circuit 10 receives an outside IR signal Outside Carry Pulse In, converts it to an electrical signal, then amplifies and shapes the electrical signal to form a carrier frequency read signal Carry Pulse In, and outputs the carrier frequency read signal to the carrier-smoothed circuit 20 and the electronic-device processor 40.

Step 3: The carrier-smoothed circuit 20 receives this carrier frequency read signal Carry Pulse In, filters out the carrier therein to form a carrier-smoothed signal Out1, and outputs this carrier-smoothed signal to a signal recognition circuit 30.

The electronic-device processor 40 receives this carrier frequency read signal Carry Pulse In, and analyzes it to recognize the carrier frequency of the outside IR signal Outside Carry Pulse In.

Step 4: The signal recognition circuit 30 receives this carrier-smoothed signal Out1, converts it from an analog voltage signal to a square wave signal, i.e. the IR recognition signal Pulse In, and outputs the IR recognition signal to the electronic-device processor 40.

Step 5: The electronic-device processor 40 also receives this IR recognition signal Pulse In, and analyzes it to learn the IR control code of the outside IR signal Outside Carry Pulse In.

The electronic-device processor 40 stores the carrier frequency and IR control code of the outside IR signal Outside Carry Pulse In. When needed, the electronic-device processor 40 may modulate the IR control code obtained by learning onto a carrier having the corresponding frequency to form a carrier signal PWM Out. The carrier signal PWM Out is a modulated signal, which is the same with the outside IR signal Outside Carry Pulse In.

Figure 4:
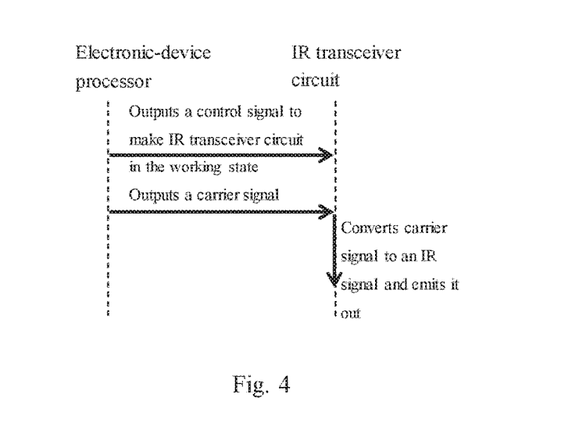
FIG. 4 is a flow diagram of the working method of the IR emission and reception circuit of this application for emitting the IR signal.

As shown in FIG. 4, the working method of the IR emission and reception circuit of this application for emitting an IR signal (typically used for simulating the IR remote control to be learnt) is as follows:

Step 1: The electronic-device processor 40 outputs a control signal Power Down Ctrl to the IR transceiver circuit 10, so that the IR transceiver circuit 10 is in the working state.

Step 2: The electronic-device processor 40 also outputs a carrier signal PWM Out to the IR transceiver circuit 10.

Step 3: The IR transceiver circuit 10 converts this carrier signal PWM Out from an electrical signal to an IR signal and emits it out.

Figure 5:
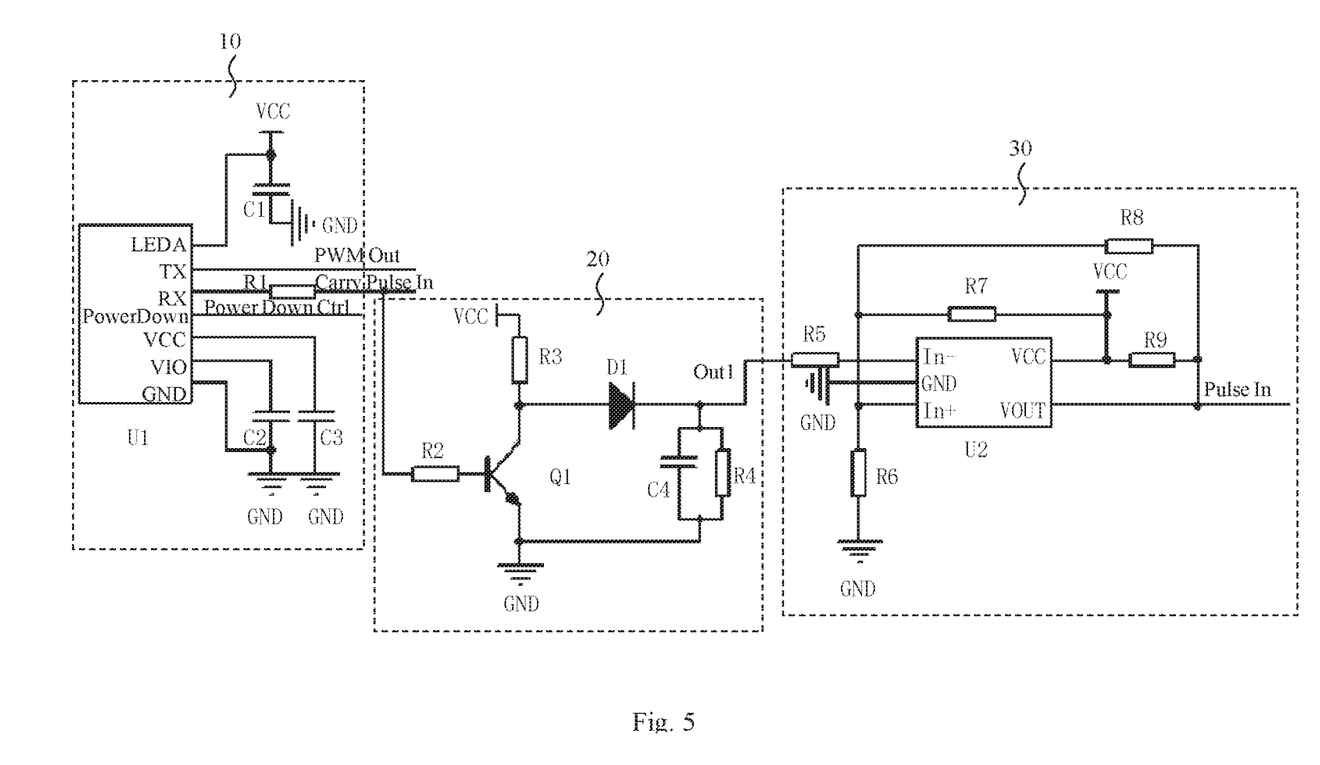
FIGS. 5 and 6 are a schematic diagram of the specific circuit structure of two examples of this application, respectively.

As shown in FIG. 5 is Example 1 of the IR emission and reception circuit of this application, which is composed of three parts, an IR transceiver circuit 10, a carrier-smoothed circuit 20, and a signal recognition circuit 30.

The IR transceiver circuit 10 includes an IR transceiver chip U1, which is a universal integrated IR transceiver chip RPM872-H12 of the ROHM company. This IR transceiver chip U1 has seven pins. An LEDA pin is both connected to the operating voltage VCC, and grounded via a first capacitor C1. A TX pin is used for receiving a carrier signal PWM Out outputted from an I/O port of the electronic-device processor. An RX pin is connected to the I/O port of the electronic-device processor via a first resistor R1, and outputs to the I/O port the carrier frequency read signal Carry Pulse In. Usually, the TX pin is used to emit a signal, and the RX pin is used to receive a signal, with the TX pin and the RX pin meeting the traditional definition with respect to the electronic-device processor. A PowerDown pin receives a control signal Power Down Ctrl outputted from the I/O port of the electronic-device processor. For example, the Power Down Ctrl signal at a high level indicates letting the IR transceiver chip U1 enter the standby state. The Power Down Ctrl signal at a low level indicates letting the IR transceiver chip U1 enter the working state. A VCC pin is grounded via a third capacitor C3. A VI0 pin is grounded via a second capacitor C2. The VCC and VI0 pins are also connected to the operating voltage VCC (not shown). A GND pin is directly grounded.

The carrier-smoothed circuit 20 includes an NPN bipolar transistor Q1. The base of this NPN bipolar transistor Q1 receives via a second resistor R2 the carrier frequency read signal Carry Pulse In outputted by the IR transceiver circuit 10. The collector of this NPN bipolar transistor Q1 is connected to the operating voltage VCC via a third resistor R3. The emitter of this NPN bipolar transistor Q1 is directly grounded. The anode of a diode D1 is connected to the collector of this NPN bipolar transistor Q1. The cathode of this diode D1 is grounded via a fourth resistor R4 and a fourth capacitor C4 interconnected in parallel, and also outputs a carrier-smoothed signal Out1.

The signal recognition circuit 30 includes a comparator chip U2, such as a single comparator BU7231G of the ROHM company. This comparator chip U2 has five pins. An In− pin is connected to the cathode of the diode D1 via a fifth resistor R5, and receives the carrier-smoothed signal Out1. An In+ pin is both grounded via a resistor R6, and connected to the operating voltage VCC via a seventh resistor R7, and is also connected to a VOUT pin via an eighth resistor R8. A VCC pin is both connected to the operating voltage VCC, and connected to the VOUT pin via a ninth resistor R9. The VOUT pin directly outputs the IR recognition signal Pulse In. The GND pin is directly grounded.

In Example 1, the RX pin of the IR transceiver chip U1 outputs the carrier frequency read signal Carry Pulse In, which convert the voltage after the first resistor R1, the second resistor R2, and the base and emitter of the NPN bipolar transistor Q1, and is read by the electronic-device processor. The electronic-device processor obtains the carrier frequency of the outside IR signal Outside Carry Pulse In by calculating the time interval between two pulses of this carrier frequency read signal Carry Pulse In. Wherein the first resistor R1 and the second resistor R2 are used to limit the base current of the NPN bipolar transistor Q1. The resistance of the second resistor R2 is selected based on the signal-voltage requirement of an interface of the electronic-device for receiving the carrier frequency read signal Carry Pulse In, and may be zero, i.e. the second resistor R2 can be omitted.

In Example 1, the NPN bipolar transistor Q1 can also be replaced by an NMOS transistor, with the base, collector and emitter of the NPN bipolar transistor Q1 corresponding to the gate, drain and source of the NMOS (N-Channel MOSFET) transistor, respectively.

In Example 1, the carrier frequency read signal Carrier Pulse In and the IR recognition signal Pulse In are either directly outputted to the I/O port of the electronic-device processor, or outputted to the I/O port of the electronic-device processor via an electronic-device UART (Universal Asynchronous Receiver Transmitter). The carrier signal PWM Out and the control signal Power Down Ctrl are either directly outputted to the IR transceiver circuit 10 via the I/O port of the electronic-device processor, or outputted to the IR transceiver circuit 10 by the electronic-device URAT via the I/O port of the electronic-device processor.

Figure 6:
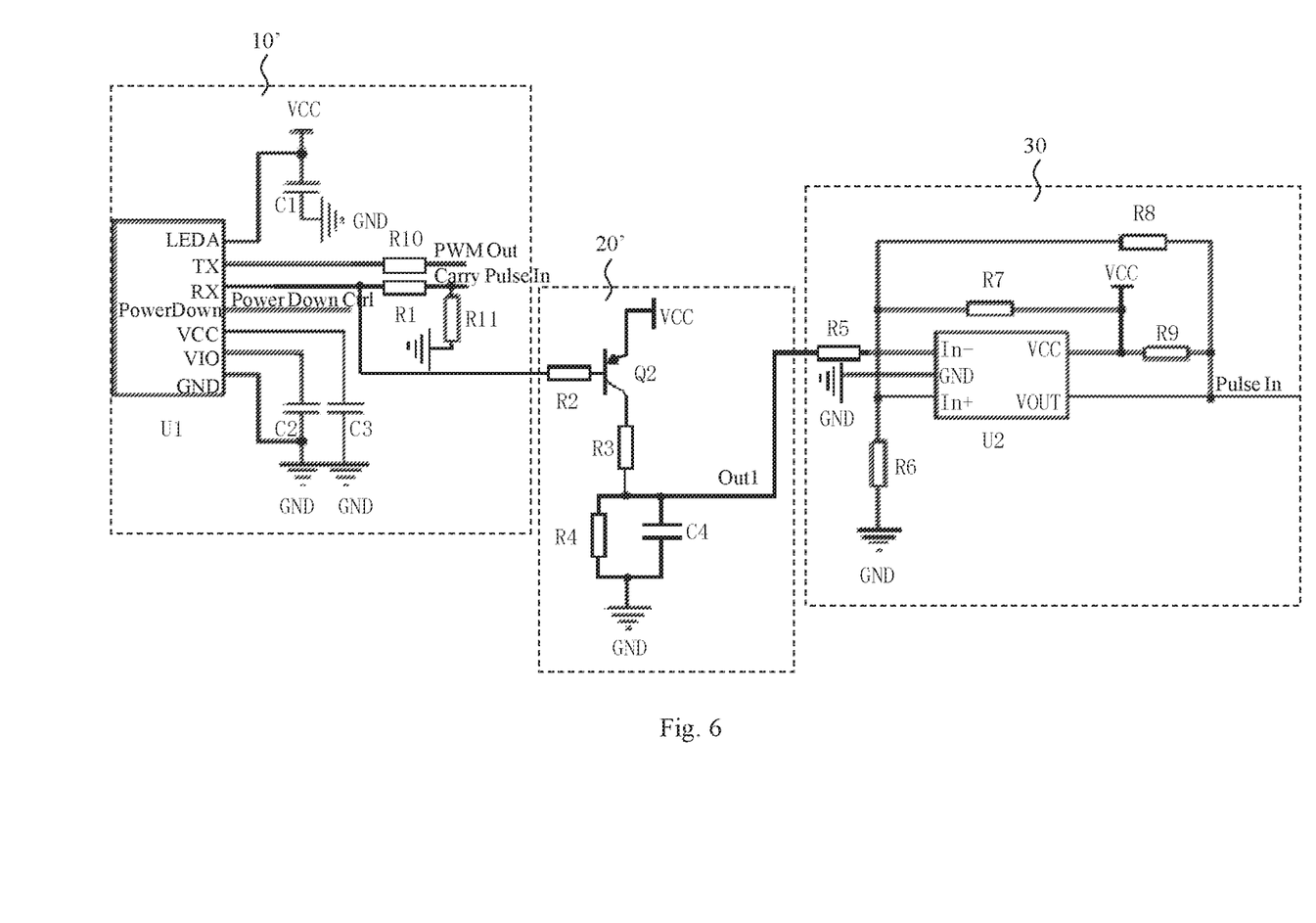

As shown in FIG. 6 is Example 2 of the IR emission and reception circuit of this application, which is composed of three parts, an IR transceiver circuit 10', a carrier-smoothed circuit 20', and a signal recognition circuit 30. Wherein the signal recognition circuit 30 is the same as in Example 1, but the IR transceiver circuit 10', the carrier-smoothed circuit 20', the connection relationship between the IR transceiver circuit 10' and the carrier-smoothed circuit 20', and the connection relationship between the carrier-smoothed circuit 20' and the signal recognition circuit 30 are different from those in Example 1.

The IR transceiver circuit 10' is additionally provided with a tenth resistor R10 and an eleventh resistor R11 on the basis of Example 1. The TX pin of the IR transceiver chip U1 receives via the tenth resistor R10 the carrier signal PWM Out outputted by the electronic-device processor. The RX pin is grounded via the first resistor R1 and the eleventh resistor R11 interconnected in series, and outputs the carrier frequency read signal Carry Pulse In between the first resistor R1 and the eleventh resistor R11.

The carrier-smoothed circuit 20' includes a PNP bipolar transistor Q2. The base of the PNP bipolar transistor Q2 is connected via the second resistor R2 to the RX pin of the IR transceiver chip U1 in the IR transceiver circuit 10', and receives the carrier frequency read signal Carry Pulse In outputted by the IR transceiver circuit 10'. The emitter of this PNP bipolar transistor Q2 is connected to the operating voltage VCC. The collector of this PNP bipolar transistor Q2 is grounded via the third resistor R3 and the fourth resistor R4 interconnected in series, with the fourth resistor R4 also connected in parallel to the fourth capacitor C4. The carrier-smoothed signal Out1 is outputted between the third resistor R3 and the fourth resistor R4.

In Example 2, the PNP bipolar transistor Q2 can also be replaced by a PMOS transistor, with the base, collector and emitter of the PNP bipolar transistor Q1 corresponding to the gate, drain and source of the PMOS (P-Channel MOSFET) transistor, respectively.

In the above two examples, the IR transceiver chip U1 in the IR transceiver circuit 10 may also be other types of integrated IR transceiver chips, such as RPM870-H14, RPM871, RPM871-H12, RPM871-H14, RPM872, RPM872-H14, RPM873, RPM971-H14, RPM972-H14, RPM973-H11 and RPM973-H16 of the ROHM company. These IR transceiver chips may be different slightly in the pin from the RPM872-H12 chip of the ROHM company, but substantially the same circuit structure can also be used for achieving the IR transceiver circuit 10. Alternatively, the IR transceiver circuit 10 may not use the IR transceiver chip U1, but use a separate IR emitting diode and an IR receiving tube having the ability to recognize carriers, such as TSMP77000 and TMP6000 of the VISHAY company. Alternatively, the IR transceiver circuit 10 can also be changed to use a separate IR emitting diode for emission; since an IR transmitting tube also has certain perception for the IR signal, the pulsed current of the IR signal in the air perceived by the IR transmitting tube can be amplified by a separate device so as to be used in the IR receiving tube.

Figure 7:
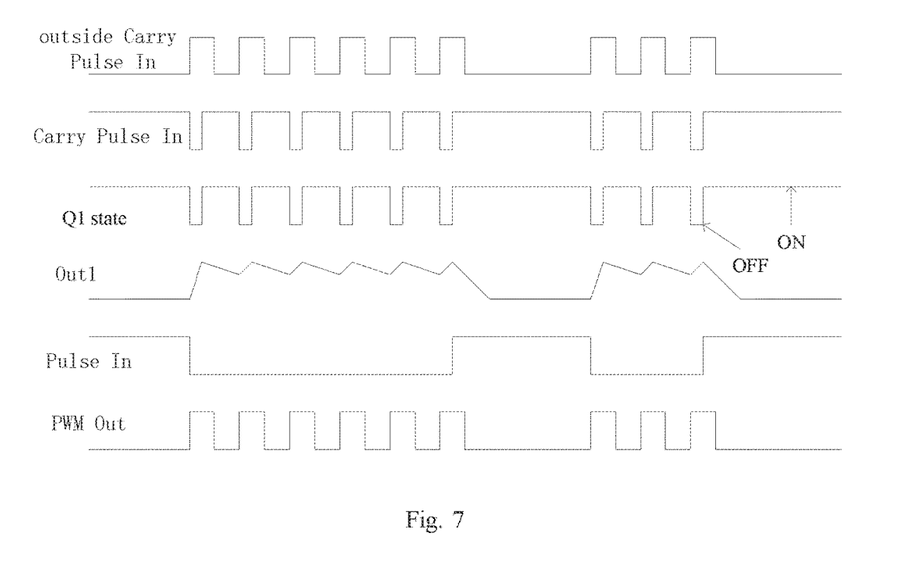
FIG. 7 is a schematic diagram of waveforms of the respective signals.

As shown in FIG. 7 is a schematic diagram of waveforms of the respective signals in the above two examples. The Q1 state is achieved, wherein the NPN bipolar transistor Q1 is used as the carrier-smoothed circuit 20 in Example 1 for an example.

For the IR transceiver circuit 10, the carrier frequency read signal Carry Pulse In outputted by the IR transceiver chip U1 and the outside IR signal Outside Carry Pulse In received by the same meet the following requirements: The outside IR signal Outside Carry Pulse In at a low level indicates that no outside IR signal is detected, and the carrier frequency read signal Carry Pulse In is at a high level. The outside IR signal Outside Carry Pulse In as a pulse signal indicates that an outside IR signal is detected, the carrier frequency read signal Carry Pulse In is also a pulse signal, and the falling edge of the carrier frequency read signal Carry Pulse In is aligned with the rising edge of the outside IR signal Outside Carry Pulse In. Limited by the pulse width of the IR transceiver chip U1, the low-level pulse width of the carrier frequency read signal Carry Pulse In may be less than the high-level pulse width of the outside IR signal Outside Carry Pulse In.

For the carrier-smoothed circuit 20 in Example 1, when there is no outside IR signal Outside Carry Pulse In, the NPN bipolar transistor Q1 is on (high level), its collector is at a low level, the diode D1 is off, and therefore the voltage across the fourth capacitor C4 is 0 and the carrier-smoothed signal Out1 (i.e. the voltage of the fourth capacitor) is at a low level. When there is an outside IR signal Outside Carry Pulse In, the falling edge of the carrier frequency read signal Carry Pulse In tracks the rising edge of the outside IR signal Outside Carry Pulse In, the NPN bipolar transistor Q1 is off (low level) when the carrier frequency read signal Carry Pulse In is at a low level, and it is on when the carrier frequency read signal Carry Pulse In is at a high level. When the NPN bipolar transistor Q1 is off, the operating voltage VCC charges the fourth capacitor C4 via the third resistor R3 and the diode D1. When the NPN bipolar transistor Q1 is on, the fourth capacitor C4 discharges via the fourth resistor R4. By selecting resistance of the third resistor R3 and the fourth resistor R4, it can be ensured that the charging capacity is greater than the discharging capacity in each cycle, and therefore the voltage across the fourth capacitor C4 can rise to accumulate. Therefore, when the carrier-smoothed circuit 20 receives the carrier frequency read signal Carry Pulse In, an analog voltage signal alternatively charging and discharging is formed at both ends of the fourth capacitor C4, thus converting the carrier frequency read signal Carry Pulse In to a carrier-smoothed signal Out1 with a ripple, thereby filtering out the carrier of the outside IR signal Outside Carry Pulse In.

In Example 1, if the carrier-smoothed circuit 20 substitutes the NMOS transistor for the NPN bipolar transistors Q1, the on and off states of the MOS transistor are the same with the NPN bipolar transistor Q1. The operating voltage VCC charges the fourth capacitor C4 when the MOS transistor is off. The fourth capacitor C4 discharges when the MOS transistor is on.

In Example 2, the carrier-smoothed circuit 20 substitutes the PNP bipolar transistor Q2 for the NPN bipolar transistors Q1, and the on and off states of the PNP bipolar transistor are opposite to the NPN bipolar transistor Q1. The operating voltage VCC charges the fourth capacitor C4 when the PNP bipolar transistor Q2 is on. The fourth capacitor C4 discharges when the PNP bipolar transistor Q2 is off.

In Example 2, if the carrier-smoothed circuit 20 substitutes the PMOS transistor for the PNP bipolar transistors Q2, the on and off states of the PMOS transistor are the same with the PNP bipolar transistor Q2. The operating voltage VCC charges the fourth capacitor C4 when the PMOS transistor is on. The fourth capacitor C4 discharges when the PMOS transistor is off.

What the carrier-smoothed circuit 20 outputs is the carrier-smoothed signal Out1 with a ripple, which cannot be recognized by the intelligent-electronic-device processor, and therefore the voltage across the fourth capacitor C4 needs to be shaped appropriately. The stable and reliable shaping is achieved in this application by applying positive feedback to the comparator chip U2.

For the signal recognition circuit 30, when there is no outside IR signal Outside Carry Pulse In, the voltage across the fourth capacitor C4 is 0; therefore, the comparator chip U2 has its negative input ON– pin at a low level, and has its positive input IN+ pin at the partial voltage of the operating voltage VCC via the seventh resistor R7 and the sixth resistor R6, with the IN+ pin bigger than the IN– pin, wherein the Vout pin of the comparator chip U2 outputs a high level. Due to the positive feedback via the eighth resistor R8, the high level of the Vout pin is superimposed on the IN+ pin through the partial voltage of the eighth resistor R8 and the sixth resistor R6. When there is an outside IR signal Outside Carry Pulse In, the voltage across the fourth capacitor C4 exceeds the voltage of the IN+ pin, and the Vout pin of the comparator chip U2 outputs a low level. Also due to the positive feedback, the voltage of the IN+ pin is pulled low, thus quickly realizing rollover of the levels, thereby reducing the risk of output interference at the Vout pin resulted from the ripple across the fourth capacitor C4. With the ninth resistor R9 as a pull-up resistor of the Vout pin, if a comparator chip U2 is selected that has a push-pull output or is provided inside with a pull-up resistor, the ninth resistor R9 may not be connected, and here the VCC pin of the comparator chip U2 is connected only to the operating voltage VCC. When there is no outside IR signal Outside Carry Pulse In, the IR recognition signal Pulse In is at a high level. When there is an outside IR signal Outside Carry Pulse In, the IR recognition signal Pulse In is at a low level. Therefore, the IR recognition signal Pulse In can be used to characterize the presence or absence of the outside IR signal Outside Carry Pulse In. The electronic-device processor, by reading the high/low level sequence of the IR recognition signal Pulse_In outputted via the Vout pin, learns the IR remote control code of the IR remote control signal.

The contents above are only the preferred examples of this application, and will not limit this application. For those skilled in the art, this application can have a variety of alteration and change. Any amendment, equivalent replacement, improvement and so on within the spirit and principle of this application shall fall within the scope of protection of this application.

The IR emission and reception circuit disclosed herein may be, for example, integrated in such an electronic device as a cell phone and a tablet computer, and is connected to an electronic-device processor. This application, filtering out a carrier through a hardware circuit, can reduce the processing cost of the electronic-device processor, and can learn the IR remote control signal more efficiently.

LIST OF REFERENCE SIGNS

10: An IR transceiver circuit; 20: a carrier-smoothed circuit; 30: a signal recognition circuit; 40: an electronic-device processor; U1: an IR transceiver chip; U2: a comparator; Q1: an NPN bipolar transistor; Q2: a PNP bipolar transistor; D1: a diode; R1-R11: resistors; C1-C4: capacitors; VCC: operating voltage; and GND: ground.

What is claimed is:

1. An infrared (IR) emission and reception circuit, comprising:
an IR transceiver circuit, a carrier-smoothed circuit and a signal recognition circuit,
wherein the IR emission and reception circuit is connected to an electronic-device processor;
the IR transceiver circuit receives a first IR signal, converts it to an electrical signal, then amplifies and shapes the electrical signal to form a carrier frequency read signal, and then outputs the carrier frequency read signal to the carrier-smoothed circuit and the electronic-device processor; the IR transceiver circuit also emits outward a second IR signal converted from a carrier signal outputted by the electronic-device processor; the carrier-smoothed circuit receives the carrier frequency read signal, filters out a carrier to form a carrier-smoothed signal, and outputs it to the signal recognition circuit;
the signal recognition circuit receives the carrier-smoothed signal, and converts it to an IR recognition signal to output to the electronic-device processor;
the electronic-device processor receives the carrier frequency read signal, and analyzes it to recognize a carrier frequency of the first IR signal; the electronic-device processor also receives the IR recognition signal, and analyzes it to learn an IR control code of the first IR signal; the electronic-device processor also outputs a control signal to the IR transceiver circuit, so as to let the IR transceiver circuit stay in a standby or working state; and the electronic-device processor also outputs the carrier signal to the IR transceiver circuit; and
wherein:
the IR transceiver circuit includes an IR transceiver chip, which has seven pins: an LEDA pin is both connected to an operating voltage, and grounded via a first capacitor; a TX pin is used for receiving the carrier signal outputted by the electronic-device processor; an RX pin outputs the carrier frequency read signal to the carrier-smoothed circuit and the electronic-device processor via a first resistor; a PowerDown pin receives a control signal sent by the electronic-device processor; a VCC pin is grounded via a third capacitor; a VIO pin is grounded via a second capacitor; both the VCC pin and the VIO pin are also connected to the operating voltage; and a GND pin is directly grounded;
the carrier-smoothed circuit includes an NPN bipolar transistor having a base, a collector and an emitter; the base is connected to the RX pin of the IR transceiver chip via a second resistor and the first resistor interconnected in series to receive the carrier frequency read signal; the collector is both connected to the operating voltage via a third resistor, and connected to an anode of a diode; a cathode of the diode both outputs the carrier-smoothed signal to the signal recognition circuit, and is grounded via a fourth resistor and a fourth capacitor interconnected in parallel; the emitter is directly grounded;
the signal recognition circuit includes a comparator chip, which has five pins: an In− pin at a negative input is connected to the cathode of the diode via a fifth resistor to receive the carrier-smoothed signal; an In+ pin at a positive input is both grounded via a sixth resistor, and connected to the operating voltage via a seventh resistor, and also connected to a Pulse In signal via an eighth resistor; a VCC pin is both connected to the operating voltage, and connected to the Pulse In signal via a ninth resistor; a VOUT pin at an output directly outputs the Pulse In signal to the electronic-device processor; and a GND pin is directly grounded.

2. An infrared (IR) emission and reception circuit, comprising:
an IR transceiver circuit, a carrier-smoothed circuit and a signal recognition circuit,
wherein the IR emission and reception circuit is connected to an electronic-device processor;
the IR transceiver circuit receives a first IR signal, converts it to an electrical signal, then amplifies and shapes the electrical signal to form a carrier frequency read signal, and then outputs the carrier frequency read signal to the carrier-smoothed circuit and the electronic-device processor; the IR transceiver circuit also emits outward a second IR signal converted from a carrier signal outputted by the electronic-device processor; the carrier-smoothed circuit receives the carrier frequency read signal, filters out a carrier to form a carrier-smoothed signal, and outputs it to the signal recognition circuit;

the signal recognition circuit receives the carrier-smoothed signal, and converts it to an IR recognition signal to output to the electronic-device processor;

the electronic-device processor receives the carrier frequency read signal, and analyzes it to recognize a carrier frequency of the first IR signal; the electronic-device processor also receives the IR recognition signal, and analyzes it to learn an IR control code of the first IR signal; the electronic-device processor also outputs a control signal to the IR transceiver circuit, so as to let the IR transceiver circuit stay in a standby or working state; and the electronic-device processor also outputs the carrier signal to the IR transceiver circuit; and wherein:

the IR transceiver circuit includes an IR transceiver chip, which has seven pins: an LEDA pin is both connected to an operating voltage, and grounded via a first capacitor; a TX pin receives the carrier signal outputted by the electronic-device processor via a tenth resistor; an RX pin directly outputs the carrier frequency read signal to the carrier-smoothed circuit, and outputs the carrier frequency read signal to the electronic-device processor via a first resistor, and is also grounded via the first resistor and an eleventh resistor interconnected in series; a PowerDown pin receives a control signal sent by the electronic-device processor; a VCC pin is grounded via a third capacitor; a VIO pin is grounded via a second capacitor; both the VCC pin and the VIO pin are also connected to the operating voltage; and a GND pin is directly grounded;

the carrier-smoothed circuit includes a PNP bipolar transistor having a base, a collector and an emitter; the base is connected to the RX pin of the IR transceiver chip via a second resistor to receive the carrier frequency read signal; the collector both outputs the carrier-smoothed signal to the signal recognition circuit via a third resistor, and is grounded via the third resistor and a fourth resistor interconnected in series, with the fourth resistor also connected in parallel to a fourth capacitor; the emitter is connected to the operating voltage;

the signal recognition circuit includes a comparator chip, which has five pins: an In− pin at a negative input is connected to an ungrounded terminal of the fourth capacitor via a fifth resistor to receive the carrier-smoothed signal; an In+ pin at a positive input is both grounded via a sixth resistor, and connected to the operating voltage via a seventh resistor, and also connected to a Pulse In signal via an eighth resistor; a VCC pin is both connected to the operating voltage, and connected to the Pulse In signal via a ninth resistor; a VOUT pin at an output directly outputs the Pulse In signal to the electronic-device processor; and a GND pin is directly grounded.

3. The IR emission and reception circuit according to claim 1, wherein the resistance of the second resistor is zero or a wire is substituted for the second resistor.

4. The IR emission and reception circuit according to claim 1, wherein the comparator chip has push-pull output or is provided inside with a pull-up resistor, the ninth resistor is omitted; and the VCC pin is connected only to the operating voltage.

5. The IR emission and reception circuit according to claim 1, wherein the NPN bipolar transistor is replaced by an NMOS transistor, with the base, collector and emitter corresponding to a gate, drain and source of the NMOS transistor, respectively.

6. The IR emission and reception circuit according to claim 2, wherein the PNP bipolar transistor is replaced by a PMOS transistor, with the base, collector and emitter corresponding to a gate, drain and source of the PMOS transistor, respectively.

* * * * *